UNITED STATES PATENT OFFICE.

CHARLES CUTHBERT FREEMAN, OF BROKEN HILL, NEW SOUTH WALES, AUSTRALIA.

DIFFERENTIAL FLOTATION CONCENTRATION OF SULFID ORES AND RAW-ORE PRODUCTS.

1,301,551.　　　　　Specification of Letters Patent.　　Patented Apr. 22, 1919.

No Drawing.　　　Application filed March 30, 1916.　Serial No. 87,789.

*To all whom it may concern:*

Be it known that I, CHARLES CUTHBERT FREEMAN, subject of the King of Great Britain and Ireland, residing at Wolfram street, Broken Hill, New South Wales, Australia, have invented certain new and useful Improvements in Differential-Flotation Concentration of Sulfid Ores and Raw-Ore Products, of which the following is a specification.

In the flotation treatment of sulfid ores and ore products for the separation of the contained mineral products from gangue, the flotation liquor used is in some cases alkalized, in other cases acidified, and under some circumstances is kept in a neutral condition, having regard to the nature and object of the particular process in operation. The obtaining of a "collective" float, in which a heterogeneous mass of mineral is separated from gangue, involves problems different from those met when the object in view is to obtain a "differential" float, in which different sulfids are raised separately, and results obtained in the one case do not indicate results obtainable in the other case even when the treatment is identical.

According to one method of treatment of powdered mixed sulfid ore, a collective float is first obtained, and this collective float is retreated by flotation to differentiate the minerals, sometimes one mineral and sometimes another mineral floating in the liquor in preference to other mineral or minerals. In another method, the powdered ore is treated directly to obtain differential floats, first one product and subsequently another product being brought up. In all cases the gangue is left with the residue in the flotation apparatus.

The factors which control the flotation of mixed sulfids are not fully recognized, nor are the conditions which operate to modify the action of the controlling factors fully understood. For practical purposes, however, it is essential to the effectiveness of any particular process that the nature of these factors and conditions shall be determined accurately. Otherwise, confusing results and not infrequently negative results are obtained. Hence it is that very frequently experimental results cannot be reproduced in actual working conditions. The action of unrecognized factors in the process brings about failures.

In differential flotation of mixed lead-zinc sulfids with alkaline carbonate solutions, it has been found that owing to heretofore undiscovered causes zinc sulfids are raised in some cases, lead sulfids in other cases, and a confused float of mixed sulfids obtained in other cases.

So much uncertainty exists as to the nature and grade of the product which is obtainable by flotation separation in alkaline liquors without reagents that no process is now used in practice which relies upon the flotation effect in alkaline liquors alone to procure a differential separation of lead sulfids, zinc sulfids, iron sulfids, and gangue, whether the pulp be ore pulp or pulp consisting of a mixed concentrate of lead sulfids and zinc sulfids.

I have conducted an extensive investigation involving many hundreds of trial separations of mixed sulfids in alkaline carbonate solutions, and made assays of results therein obtained to discover hitherto unknown factors which have operated to produce what have appeared to be inconsistent and reversed results obtained in practice, and the present invention is based on the facts ascertained and deduced from this systematic and comprehensive course of experimentation.

I am not concerned with processes in which organic frothing agents are used. These agents are unnecessary and undesirable in the operation of my process, but my results are nevertheless obtainable when organic frothing agents are present in very small proportions in the pulp or in the flotation liquor. I am concerned only with the "differential" separation of complex sulfid ores, whether from ore pulp or from mixed concentrates, to obtain lead sulfids separately from zinc sulfids and iron sulfids, by agitation-aeration flotation in a circuit liquor containing an alkaline carbonate.

A process has been published according to which it is claimed that blende is preferentially floated by agitation-aeration in a dilute aqueous solution of sodium carbonate and that the separation is made more effective by increase of temperature. This process however produces indifferent or negative results in many cases, and the cause of the failure has not been determined heretofore. The process is therefore too unreliable for practical use and it is not in fact used commercially.

The investigations made by me now establish the heretofore unrecognized fact that the process above referred to obtains a float of blende only when the zinc sulfid particles are superficially metallized with certain other metals (e. g., copper) to a definite extent, and that where only partial metallization of the blende has occurred an indiscriminate float is procured. The metallizing of the zinc sulfids is the result of electrolytic or other action when copper or a metal electro-negative to copper or a salt of copper or of such other metal soluble in the liquor is in contact with or present in the flotation liquor. That "metallizing" occurs has been established in numerous and various tests. When the flotation is effected in apparatus constructed wholly of iron, or of other metal not electro-negative to copper, or if constructed of wood, and if also no copper or other metal electro-negative to copper be present, e. g., mercury or silver (in both cases referring not only to the metals in the free state, but also compounds of the said metals, e. g., soluble salts of these metals), a definitely preferential action in respect of lead sulfids is displayed. The temperature at which the process is conducted affects the rate at which separation occurs, as in other flotation separation processes. Copperization of the blende occurs more readily and more completely at higher than at lower temperatures when the operation is conducted in copper apparatus.

The effects referable to copperizing of the blende are found displayed when the ore is treated in a copper apparatus in the first instance to obtain a collective float and such collective float is subjected to reflotation in a machine of wood, iron or other inert material to obtain the galena and blende separately. In this case it is usually found that the degree of copperizing is insufficient to endow the blende with distinctly better floatable quality than the galena, but that it is enough to modify the effect of the liquor so that a greater or less proportion of the blende comes up with the galena, resulting in a more or less confused or indiscriminate float. In all cases, however, the copperizing of the blende even when extensive is not enough to endow the blende with a very exalted flotation value when mixed with an excess of the galena, so that it is always necessary even when the conditions are favorable to the raising of the blende that the operation shall be conducted with care. Otherwise more or less galena will come up with the blende and foul the result.

Now it is practically never possible to obtain a preferential blende float direct from ore pulp in an alkaline carbonate solution, unless indeed positive means for copperizing or otherwise endowing the blende with superior floatable qualities are used, and that has not been suggested heretofore. Even when copper apparatus is used, the extent of the copperizing effect is insufficient to endow the blende with superior floatable qualities. But if a collective float is first obtained by treatment in copper apparatus, and this collective float is subjected to reflotation in an alkaline carbonate solution, again using copper apparatus, then in this second operation, the copperization of the blende is sufficiently completed and a preferential blende float will be obtained, the bulk of the galena remaining as unfloated residue.

An incidental proof that the hitherto unobserved copperizing of the blende is the crucial factor in this method of treating sulfid pulps is had in the fact that if some oil (eucalyptus oil for instance) such as is usually applied as a frothing agent is added to the pulp before contact with copper occurs, the effects otherwise obtained are distinctly modified, owing to the fact that the filming of the blende with oil inhibits copperizing to a greater or less extent. And the same is the case if a copper salt be added to the liquor. But if a copper salt be added to the liquor before oil is introduced, the blende acquires the floatable character due to copperization. Copper salts unless employed in excessive quantity cannot be found, by the ordinary analytical methods in the liquor at the conclusion of the operation, but their presence with the separated blende can be shown by the usual chemical tests. In the case of repetitive flotation, when the first float is obtained by any known process in which the liquor is strongly acid, then notwithstanding that the blende suffers copperizing only in the retreatment, a preferential blende float will be obtained, partly owing to the partial copperizing of the blende and partially to the deadening effect of the acid on the galena. In this case the galena is seen to be discolored by the action of the acid thereupon. It is therefore clear that any hitherto existing belief that alkaline liquors alone produce a preferential zinc float from clean mixed sulfid pulp is entirely erroneous. Blende has been separated in fact in such solutions by the agency of copper or other operative factors, which act either to exalt the floatable qualities of the blende or to diminish the floatable qualities of the galena, or both.

My object in another mode of operation is to obtain a preferential float of galena, and I attain this object by avoiding contact of the pulp with copper and with metals electro-negative to copper and with salts of said metals which are soluble in the liquor, preferably avoiding the introduction of organic frothing agents, and conducting the operation as hereinafter described.

The aqueous solution of alkaline carbonate which constitutes my flotation bath may vary in strength over a wide range—from about 1% to about 10%—according to the behavior therein of the particular ore or concentrate under treatment. The appropriate strength to produce most effective results in any particular case is readily ascertainable by laboratory test on a few grams of the ore or concentrate which is to be treated.

The ore or concentrate to be operated upon should preferably not carry or contain oils or other organic substances; and it is economically desirable that it shall not be in an acid condition.

The following are examples of treatment of a variety of pulps according to this present process.

In the case of a calcitic ore, using a flotation liquor containing 2.5% of sodium carbonate, and conducting the operation in a wrought iron vessel at a temperature of 50° C., and employing aeration-agitation according to known practice for a period of about four minutes, I obtained a float consisting of 63.2% lead, and 8.6% zinc. A reflotation of this product under the same conditions yielded a product containing 73% lead and 6.2% zinc. The values contained in the untreated pulp were 15% lead and 9.7% zinc. The ultimate differential result in favor of lead was therefore in this case approximately 7.6 to 1.

A similar ore pulp treated in a copper machine yielded a concentrate containing 39.2% lead and 27.8% zinc. The presence of the copper in the machine therefore destroyed the preferential effect of the flotation, the concentrate obtained having about the same relative proportions of lead and zinc as the original pulp.

In the case of a rhodonitic ore treated with a similar liquor in a wrought iron vessel at temperature 60° C. for a period of three minutes, the ore assay being 14.4 zinc and 14.6 lead, a concentrate was obtained carrying 65.8% lead and 7.1% zinc, and from this a re-concentrate was obtained by a repetition of the same treatment carrying 74.6% lead and 4.8% zinc.

A similar ore treated in the same way in a copper vessel yielded a first concentrate containing 23.5% lead and 35.8% zinc, while the reconcentrate contained 21.4% lead and 39% zinc. This is a case in which the copperizing of the blende displayed itself in the retreatment, so that blende was raised in preference to galena.

A silicious ore treated in a similar liquor in a wrought iron vessel at 59° C. for four minutes, and containing 12.5% zinc and 10.4% lead, yielded a concentrate containing only 10.2% zinc but 60% lead; while a similar ore subjected to the same process in a copper vessel produced a concentrate containing 33.4% zinc and 29% lead.

I have also successfully treated collective floats obtained by other processes, so as to obtain galena from them, leaving the blende with the residue.

An instance of the inefficacy of alkaline carbonate flotation to obtain differential results is found in the case of the retreatment of a collective "Potter" float obtained in iron apparatus and containing 33.2% zinc and 27.8% lead. This collective float was washed and then re-treated in a 2.5% solution of soda carbonate, in a copper machine, at 50° C., five minutes period of contact and four minutes period of agitation-aeration being allowed. The float thus obtained consisted of 34.4% zinc and 27.4% lead, these relative proportions of constituents being substantially identical with their relative proportions in the collective float before retreatment. In this case the metallizing of the blende was insufficient to produce differential flotation effects. If the retreatment had been conducted in an iron or wooden machine a preferential galena float would have been obtained. A distinct metallization would have brought about a distinct differentiation of products and so procured a preferential flotation of blende in the alkaline carbonate solution.

A retreatment of a collective float obtained with boiling acid (4% sulfuric acid), and containing 31.4% zinc and 27.5% lead, gave on retreatment 62.2% lead and 11.6% zinc, a very substantial differentiation in the favor of lead being procured in this case. The reflotation was effected in a wrought iron machine with a 2.5% solution of carbonate of soda, at temperature 57° C., with five minutes contact and four minutes aeration-agitation. A portion of the same collective float retreated in a copper machine instead of in an iron machine as in the last mentioned case, produced, in consequence of the partial metallization of the blende, an entirely opposite result, viz., 15.8% lead and 43.2% zinc. The action of the first acid flotation in the galena was also displayed in retarding its flotation in the reflotation step. The collective float was in each case washed and aerated, in the one case in a wrought iron machine and in the other case in a copper machine, with a very small quantity of sodium sulfid, before being submitted to reflotation. The same rule is established for the retreatment of collective floats produced by original treatment in acid liquors with oil.

A collective float obtained in a copper machine with acid and eucalyptus oil contained 27.5 per cent. zinc and 30.9% lead. After the original treatment the collective float was drained, water containing sulfureted hydrogen added, and the pulp allowed to stand therein for thirty minutes. After again draining and agitating in water to expel sulfureted hydrogen, retreatment was effected in a copper vessel with three per cent. sodium carbonate, one-tenth of a pound of eucalyptus oil per ton of ore being added, and the treatment effected at 60° C., with one minute contact and five minutes aeration-agitation. The result was a float containing 42.4% zinc and 16% lead. This result represents an imperfect differentiation, but evidences the fact that the original and the repeat treatment in copper machines effected a sufficient copperization of the blende to endow the blende with distinctly floatable qualities as against galena. Taking in contrast with this another collective float produced by similar acid and oil treatment in a wooden vessel and containing 23.4% zinc and 38.4% lead, after intermediate treatment as in the last mentioned case, repetitive reflotation in a wooden machine in a 3% solution of carbonate of soda, at 52° C., time of treatment two minutes contact and three minutes aeration-agitation, gave a product containing 62.8% lead and 12.4% zinc. The contrast in the refloat product thus obtained with that obtained in the last mentioned case, clearly evidences the fact that the carrying out of the process in copper and wood machines respectively, procures an entire reversal of the differential effect in respect of galena and blende.

In another case in which the procedure was similar, the first treatment was carried out in a copper machine and the retreatment in a wooden machine, with the result that the refloated product was a mixed float practically identical in lead and zinc constituents with the original collective float. In this case a partial metallizing of the blende occurred sufficient to disturb the preference which would otherwise have been displayed in favor of galena, and the result was that blende and galena were brought up together in the refloat.

The same fact has been established in connection with the retreatment of collective floats produced in alkaline liquors with oil, so that it is made clear under all circumstances that absence of metallization of the blende will result in preferential action of alkaline carbonate solutions on the galena, that partial metallization of the blende will approximate the blende and galena in floatable qualities in such solutions, and that relatively extensive copperization of the blende will render the blende distinctly more floatable than the galena, so that a preferential float of blende is obtainable.

This general statement need not be substantially qualified when the process used involves the introduction of sulfureted hydrogen, soda sulfid, or other reagents for the purpose of procuring certain definite known effects.

In operating with alkaline carbonate solutions the addition of oil is unnecessary for promoting flotation of the galena in preference to blende, but galena flotation can be successfully effected notwithstanding the presence of some oil. Oil operates to encourage the lifting of blende with the galena, and when this tendency is encouraged unnecessarily, the galena float obtained is fouled with a certain proportion of blende, which in the absence of oil would have remained with the residues.

The degree of concentration of the solution may vary up to 10%, but I have usually operated successfully with solutions containing within 3% of soda carbonate in water. The operation is preferably conducted at a moderate temperature, and the apparatus used is ordinarily constructed of wood or iron. Three to four weights of flotation liquor to each weight of dry ore or pulp is used. The greater part of the silver present is brought up with the galena. The raw ore or mixed concentrates to be operated on is reduced to that degree of fineness which is necessary in order to mechanically liberate the mineral particles from the gangue and from each other, and facilitates flotation; ordinarily about 70 mesh is desirable. This is the case with characteristic Broken Hill ores. But in some cases the fineness must approach 200 mesh and in other cases a coarser mesh than 70 suffices.

The powdered ore or mixed concentrate is pulped in the solution or may be milled therein, and the flotation operation is conducted in any known type of flotation separation apparatus in which the pulp is maintained in agitation and air beaten into it energetically for a period of one minute or more, depending upon the nature of the material, five minutes or even more being found necessary in some cases. The product rises to the surface in a froth in the well known manner and is overflowed or skimmed or otherwise removed upon its reaching the surface or before it attains the surface. The bulk of the gangue and the bulk of the blende and iron pyrites contents remain as a heavy residue with the gangue and are removed from the machine continuously or at intervals. The leady concentrate obtained by treatment in this manner may be further concentrated by a repetition of the same treatment. The blende is obtained from the gangue, iron pyrites (if present) and other residues by submitting the same to reflotation in the same medium (a lesser density of solution sufficing in this case), using a copper machine and adding a small proportion of an essential oil or other known frothing agent. I have not found it necessary to apply any considerable degree of heat to facilitate the action, which is ordinarily effected at atmospheric temperatures and up to say 60° C. My process is of particular commercial value when the zinc content predominates in the ore or mixed concentrate and when removal of iron pyrites is necessary.

What I claim as my invention and desire to secure by Letters Patent is:—

1. A process for preferentially separating galena from mixed sulfid ore pulp or concentrates, which consists in submitting said mixed pulp to agitation-aeration flotation in and collecting the float from a dilute aqueous solution of alkaline carbonate and in such operation floating one sulfid while substantially excluding other sulfids from the float, such operation being conducted while excluding contact of the flotation bath with metallic copper and metals electro-negative to copper and also salts of said metals which are soluble in said solution.

2. A process for preferentially separating galena from sulfid ore pulp or concentrates containing iron pyrites, which consists in submitting said mixed pulp to agitation-aeration in and collecting the float from a dilute aqueous solution of an alkaline carbonate, and in such operation floating one sulfid while substantially excluding other sulfids from the float, such operation being conducted while excluding contact of the flotation bath with metallic copper and metals electro-negative to copper and also salts of said metals which are soluble in said solution.

3. In the process of differentially floating galena from sulfid ore mixed pulp or mixed concentrates by agitation-aeration in a dilute aqueous solution of an alkaline carbonate, the step of floating a part only of the sulfids present in the mixture while prohibiting contact of said ore metal and of the said solution, with copper and with metals electro-negative to copper and with soluble metallic salts of all such metals.

4. A process of floating galena from sulfid ore pulp or mixed concentrates, which consists in submitting the same to differential flotation by aeration-agitation in a dilute aqueous solution of sodium carbonate in a copper-free apparatus, and preventing contact of said pulp or concentrate and solution throughout the treatment with copper and copper salts soluble in said solution.

5. A process of floating galena from mixed material containing zinc and iron sulfids, which consists in submitting the same to differential flotation by aeration-agitation in a dilute aqueous solution of sodium carbonate in an apparatus of which the parts coming into contact with the solution are constructed of materials entirely free from copper and from metals which are electro-negative to copper and while preventing contact of the ore material and of the solution throughout the treatment with copper and with copper salts soluble in said solution.

6. A process for separating galena from mixed sulfid ore pulp or concentrates, which consists in submitting said pulp to agitation-aeration flotation and collecting the float containing galena but substantially free from other metal sulfids, such flotation being performed in a dilute aqueous solution of alkaline carbonate, while in the absence of added oily material, and while excluding from contact therewith metallic copper and metals electro-negative to copper and also salts of said metals which are soluble in said solution.

7. A process for separating galena from sulfid ore pulp or concentrates containing iron pyrites, which consists in submitting said pulp to agitation-aeration in and collecting the float from a dilute aqueous solution of an alkaline carbonate, whereby galena substantially free from other sulfids is floated, such operation being conducted in the absence of added oily material, and while excluding from contact therewith metallic copper and metals electro-negative to copper and also salts of said metals which are soluble in said solution.

8. A process for differentially floating galena from zinc and iron sulfids, which consists in submitting the same to selective flotation of the galena while substantially excluding zinc and iron sulfids from the float, such selective flotation being performed by aeration-agitation in a dilute aqueous solution of sodium carbonate, in an apparatus of which the parts coming into contact with the solution are constructed of materials entirely free from copper and from metals which are electro-negative to copper and while preventing contact of the ore material and of the solution throughout the treatment with copper and with copper salts soluble in said solution, and while in the absence of added oily material.

In testimony whereof I have affixed my signature in presence of two witnesses.

CHARLES CUTHBERT FREEMAN.

Witnesses:
H. C. CAMPBELL,
W. J. DAVIS.